US00RE43660E

(19) United States
(12) Reissued Patent
Sakuma et al.

(10) Patent Number: US RE43,660 E
(45) Date of Reissued Patent: Sep. 18, 2012

(54) FLOW SENSOR USING A HEAT ELEMENT AND A RESISTANCE TEMPERATURE DETECTOR FORMED OF A METAL FILM

(75) Inventors: Noriyuki Sakuma, Kodaira (JP); Naoki Yamamoto, Kochi (JP); Kenichi Takeda, Tokorozawa (JP); Hiroshi Fukuda, Tokyo (JP)

(73) Assignee: Hitachi, Ltd., Tokyo (JP)

(21) Appl. No.: 12/805,390

(22) Filed: Jul. 28, 2010

Related U.S. Patent Documents

Reissue of:
(64) Patent No.: 7,404,320
Issued: Jul. 29, 2008
Appl. No.: 11/330,969
Filed: Jan. 13, 2006

(30) Foreign Application Priority Data

Sep. 7, 2005 (JP) ..... 2005-259902

(51) Int. Cl.
*G01F 1/68* (2006.01)
(52) U.S. Cl. ..... 73/204.26
(58) Field of Classification Search ..... None
See application file for complete search history.

(56) References Cited

U.S. PATENT DOCUMENTS

| | | | |
|---|---|---|---|
| 4,129,848 | A | 12/1978 | Frank et al. |
| 4,478,076 | A | 10/1984 | Bohrer |
| 4,507,851 | A | 4/1985 | Joyner et al. |
| 4,884,443 | A | 12/1989 | Lee et al. |
| 4,888,988 | A | 12/1989 | Lee et al. |
| 4,966,037 | A | 10/1990 | Sumner et al. |
| 5,006,421 | A | 4/1991 | Yang et al. |
| 5,068,020 | A | 11/1991 | Chu et al. |
| 5,281,485 | A | 1/1994 | Colgan et al. |
| 5,434,363 | A | 7/1995 | Goto et al. |
| 5,780,173 | A | 7/1998 | Harrington et al. |
| 5,798,684 | A | 8/1998 | Endo et al. |
| 6,096,127 | A | 8/2000 | Dimos et al. |
| 6,118,166 | A | 9/2000 | Shoji et al. |
| 6,146,959 | A | 11/2000 | DeBoer et al. |
| 6,203,673 | B1 | 3/2001 | Shoji et al. |
| 6,450,025 | B1 | 9/2002 | Wado et al. |

(Continued)

FOREIGN PATENT DOCUMENTS

DE 199 51 595 A1 5/2001

(Continued)

OTHER PUBLICATIONS

European Search Report dated Feb. 13, 2007.

(Continued)

*Primary Examiner* — Harshad R Patel
(74) *Attorney, Agent, or Firm* — Mattingly & Malur, PC

(57) ABSTRACT

The present invention provides a technology capable of achieving a highly-sensitive flow sensor, by forming a metal film having a relatively high TCR on a semiconductor substrate via an insulating film. A measurement device which is a thermal fluid flow sensor includes a heat element, resistance temperature detectors (upstream-side resistance temperature detector and downstream-side resistance temperature detector), and a resistance temperature detector for air which are all formed of a first metal film. The first metal film is formed of an α-Ta film having a resistivity lower than three times the resistivity of a Ta ingot and obtained by deposition through sputtering on an amorphous film containing metal.

50 Claims, 8 Drawing Sheets

U.S. PATENT DOCUMENTS

| | | | | |
|---|---|---|---|---|
| 6,523,403 | B1 | 2/2003 | Fuertsch et al. | |
| 6,538,858 | B1 * | 3/2003 | Hasegawa et al. | 360/324.12 |
| 6,674,502 | B1 | 1/2004 | Terakado et al. | |
| 6,701,782 | B2 | 3/2004 | Iwaki et al. | |
| 2003/0108664 | A1 | 6/2003 | Kodas et al. | |
| 2006/0267724 | A1 | 11/2006 | Parsons | |

FOREIGN PATENT DOCUMENTS

| | | | |
|---|---|---|---|
| EP | 0 245 092 | A2 | 5/1987 |
| EP | 0 245 092 | | 11/1987 |
| EP | 0 375 399 | A2 | 6/1990 |
| JP | 05-223613 | | 2/1992 |
| JP | 06-230021 | | 2/1993 |
| JP | 06-300605 | | 4/1993 |
| JP | 06-317440 | | 5/1993 |
| JP | 05-223613 | | 8/1993 |
| JP | 5-341324 | A | 12/1993 |
| JP | 07-190822 | | 12/1993 |
| JP | 06-230021 | | 8/1994 |
| JP | 08-054269 | | 8/1994 |
| JP | 06-300605 | | 10/1994 |
| JP | 06-317440 | | 11/1994 |
| JP | 07-190822 | | 7/1995 |
| JP | 8-19516 | B2 | 2/1996 |
| JP | 08-054269 | | 2/1996 |
| JP | 8-159834 | A | 6/1996 |
| JP | 10-213470 | | 1/1997 |
| JP | 10-213470 | | 8/1998 |
| JP | 2001-147424 | A | 5/2001 |
| JP | 2003-42824 | A | 2/2003 |

OTHER PUBLICATIONS

Motonobu et al., "Resistance Change in Thin Ag Film on Si(100)", Jpn. J. Appl. Phys. vol. 42 (2003), pp. 6532-6534; Osaka, Japan, Oct. 10, 2003.

Extended European Search Report Communication issued by the European Patent Office on Feb. 4, 2011 in Application No. 10009399.6—2213.

"Resistance Change in Thin Ag Film on Si(100)", Jpn. J. Appl. Phys. vol. 42 (2003) pp. 6532-6534; Motonobu et al. Osaka, Japan, Oct. 10, 2003.*

* cited by examiner

FLOW SENSOR USING A HEAT ELEMENT AND A RESISTANCE TEMPERATURE DETECTOR FORMED OF A METAL FILM

Matter enclosed in heavy brackets [ ] appears in the original patent but forms no part of this reissue specification; matter printed in italics indicates the additions made by reissue.

CROSS-REFERENCE TO RELATED APPLICATION

The present application claims priority from Japanese Patent Application No. JP 2005-259902 filed on Sep. 7, 2005, the content of which is hereby incorporated by reference into this application.

TECHNICAL FIELD OF THE INVENTION

The present invention relates to a flow sensor for fluid or gas. More particularly, it relates to a technology effectively applied to a sensor for measuring a fluid or gas flow.

BACKGROUND OF THE INVENTION

As an air flowmeter installed in an electronically-controlled fuel injection system of an internal combustion engine of an automobile or the like for measuring intake air flow, a thermal fluid flow sensor has been the mainstream because it can directly detect a mass air volume. In particular, a thermal fluid flow sensor manufactured using a semiconductor micromachining technology has received attention because it can be manufactured at low cost and can be driven by low power.

For example, a thermal micro flow sensor is disclosed, which is provided with a heater line formed to have a thermal insulation structure on a semiconductor substrate by a semiconductor micromachining technology with using a material in a range of $3.1\times10^{-7}$ to $2\times10^{-2}$ Ωm so that a resistance value becomes approximately 1 kΩ (for example, paragraphs [0027] to [0029] of Japanese Patent Application Laid-Open Publication No. 8-54269). Also, a flow sensor is disclosed, in which an upstream-side resistance temperature detector, a heat element, and a downstream-side resistance temperature detector are sequentially arranged in a fluid flowing direction, the resistance temperature detectors are formed of a thin film or a line made of a material having a large resistance temperature coefficient such as Ni, and the heat element is formed of Pt, which has a resistance temperature coefficient smaller than that of Ni (for example, paragraphs [0012] to [0015] of Japanese Patent Application Laid-Open Publication No. 5-223613). Furthermore, a thin-film resistor is disclosed, which is made of a platinum resistance film having a crystal grain diameter of 800 Å or larger formed on a surface of an insulated substrate by sputtering (for example, paragraph [0018] of Japanese Patent Application Laid-Open Publication No. 10-213470).

Still further, a heat-sensitive flowmeter is disclosed, in which an upstream-side beam temperature detector and a downstream-side beam temperature detector are formed on upstream and downstream sides of the same beam, a first electrical bridge circuit is formed by a main temperature detector and a fluid temperature detector together with a resistance element for balance adjustment, a second electrical bridge circuit is formed by the upstream-side and downstream-side beam temperature detectors together with other resistance elements for balance adjustment, and a digital memory arithmetic circuit retains the outputs of the first and second electrical bridge circuits to perform an arithmetic process for obtaining a flow velocity with zero-point correction (for example, FIG. 1 of Japanese Patent Application Laid-Open Publication No. 6-230021). Also, a heat-sensitive microbridge flow velocity meter is disclosed, in which a heat element and a main resistance temperature detector are formed on a main beam, a sub-resistance temperature detector is formed on a downstream side, a resistance temperature detector for fluid is formed on an upstream side, a first electrical bridge circuit in which the main resistance temperature detector, the sub-resistance temperature detector, and the resistance temperature detector for fluid are connected to one another is provided, a second electrical bridge circuit in which the sub-resistance temperature detector and the resistance temperature detector for fluid are connected to each other is provided, and an arithmetic process of the outputs of the first and second electrical bridge circuits is performed (for example, FIG. 1 of Japanese Patent Application Laid-Open Publication No. 6-300605). Still further, a heat-sensitive microbridge flowmeter is disclosed, in which a resistance element for room temperature calibration is provided on a substrate, a resistance element for current measurement is provided outside the substrate, an electrical bridge in which a resistance temperature detector for a heat element, a resistance temperature detector for fluid, and a resistance element for balance adjustment are connected to one another is provided, an electrical measurement circuit which measures a voltage drop value at any time and outputs it as a digital signal is provided, and an arithmetic processing circuit which performs an arithmetic process for eliminating an error due to the change in room temperature is provided (for example, FIG. 1 of Japanese Patent Application Laid-Open Publication No. 6-317440).

Still further, a heat-sensitive flow velocity meter is disclosed, in which two heat-sensitive units having the same or similar physical properties are provided, and the units are both calibrated so as to have a similar or equivalent static characteristic which is a characteristic under a windless state and to have different dynamic characteristics which are changed depending on flow velocity (for example, paragraph [0013] and FIG. 1 and FIG. 2 of Japanese Patent Application Laid-Open Publication No. 7-190822).

SUMMARY OF THE INVENTION

By forming a resistance temperature detector of a thermal fluid flow sensor by using a metal film having a relatively high temperature coefficient of resistance (hereinafter abbreviated as a TCR), detection sensitivity of the resistance temperature detector can be improved. However, according to the studies by the inventors of the present invention, the TCR of the metal film formed on a semiconductor substrate made of single crystal Si (silicon) via an insulating film is lower than the TCR of the metal film formed directly on a semiconductor substrate made of single crystal Si via no insulating film. Therefore, a relatively high TCR inherent in the metal film cannot be obtained although the metal film is used as a resistance temperature detector of a thermal fluid flow sensor, and the detection sensitivity of the resistance temperature detector is degraded.

An object of the present invention is to provide a technology capable of achieving a highly-sensitive flow sensor by forming a metal film having a relatively high TCR on a semiconductor substrate via an insulating film.

The above and other objects and novel characteristics of the present invention will be apparent from the description of this specification and the accompanying drawings.

The typical ones of the inventions disclosed in this application will be briefly described as follows.

The present invention provides a flow sensor which includes a heat element and a resistance temperature detector formed on a semiconductor substrate via an insulating film and measures a fluid or gas flow, wherein the heat element and the resistance temperature detector are formed of a Ta film with a body-centered cubic crystal structure having a resistivity lower than three times the resistivity of a Ta (tantalum) ingot.

The effects obtained by typical aspects of the present invention will be briefly described below.

Since a Ta film having a relatively high TCR is formed on a semiconductor substrate via an insulating film, it is possible to achieve a highly-sensitive flow sensor.

BRIEF DESCRIPTIONS OF THE DRAWINGS

DESCRIPTIONS OF THE PREFERRED EMBODIMENTS

In the embodiments described below, when referring to the number of elements (including number of pieces, values, amount, range, and the like), the number of the elements is not limited to a specific number unless otherwise stated or except the case where the number is apparently limited to a specific number in principle. The number larger or smaller than the specified number is also applicable. Further, in the embodiments described below, it goes without saying that the components (including element steps) are not always indispensable unless otherwise stated or except the case where the components are apparently indispensable in principle. Similarly, in the embodiments described below, when the shape of the components, positional relation thereof, and the like are mentioned, the substantially approximate and similar shapes and the like are included therein unless otherwise stated or except the case where it can be conceived that they are apparently excluded in principle. This condition is also applicable to the numerical value and the range described above.

Also, components having the same function are denoted by the same reference symbols throughout the drawings for describing the embodiments, and the repetitive description thereof is omitted.

First Embodiment

Figure 1:
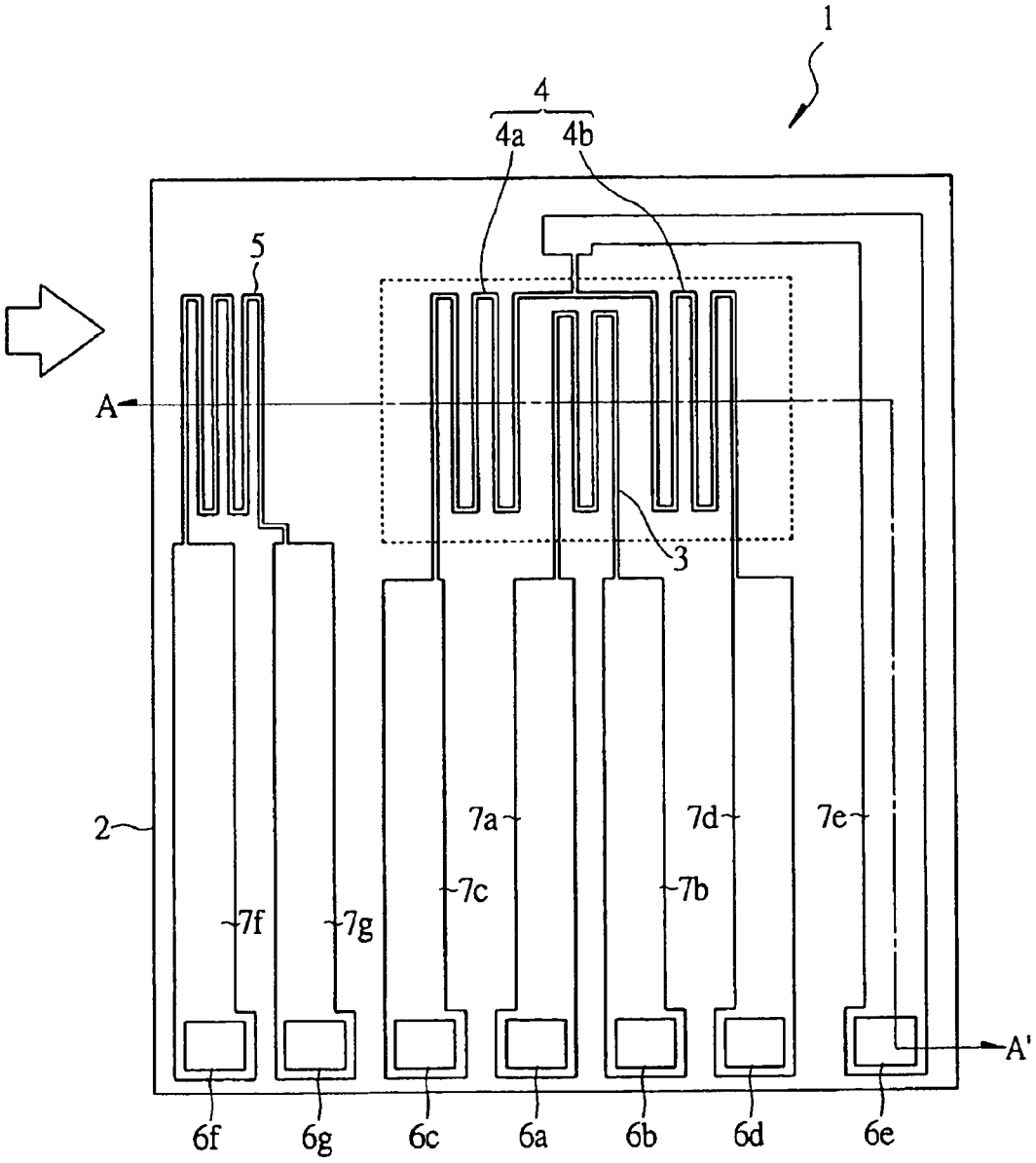
FIG. 1 is a plan view of main parts of one example of a thermal fluid flow sensor according to a first embodiment of the present invention.

An example of a plan view of main parts of a thermal fluid flow sensor according to a first embodiment is shown in FIG. 1.

A measurement device 1, which is a thermal fluid flow sensor, includes a semiconductor substrate 2 made of single crystal Si, a heat element 3 formed on the semiconductor substrate 2 via an insulating film, a resistance temperature detector 4 composed of an upstream-side resistance temperature detector 4a and a downstream-side resistance temperature detector 4b for detecting a temperature of air heated by the heat element 3, a resistance temperature detector for air 5 for measuring an air temperature, terminal electrodes 6a, 6b, 6c, 6d, 6e, 6f, and 6g for connecting signals from the measurement device 1 to an external circuit, lead wirings 7a and 7b for connecting both ends of the heat element 3 to the terminal electrodes 6a and 6b, lead wirings 7c and 7d for connecting both ends of the resistance temperature detector 4 to the terminal electrodes 6c and 6d, a lead wiring 7e for connecting a node between the upstream-side resistance temperature detector 4a and the downstream-side resistance temperature detector 4b to the terminal electrode 6e, and lead wirings 7f and 7g for connecting both ends of the resistance temperature detector for air 5 to the terminal electrodes 6f and 6g.

The width of the heat element 3 is, for example, about 10 to 20 μm, and the width of the resistance temperature detector 4 is, for example, about 1 to 2 μm. Also, the width of each of the lead wirings 7a, 7b, 7c, 7d, 7e, 7f, and 7g is, for example, about 100 μm.

Next, one example of a method of manufacturing a thermal fluid flow sensor according to the first embodiment will be described along the order of process steps with reference to FIG. 2 to FIG. 6. FIG. 2 to FIG. 6 are cross-sectional views of main parts taken along the line A-A' in FIG. 1.

Figure 2:
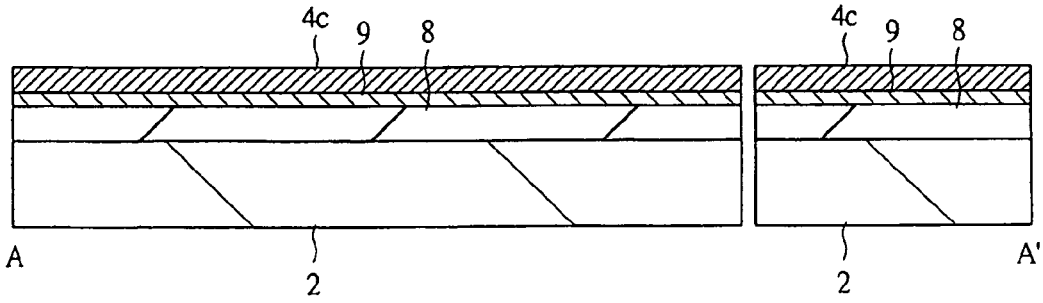
FIG. 2 is a cross-sectional view of main parts showing a manufacturing process of the thermal fluid flow sensor according to the first embodiment of the present invention.

First, as shown in FIG. 2, a semiconductor substrate 2 made of single crystal Si is prepared. Then, an insulating film 8, an amorphous film 9 containing metal, and a first metal film 4c are sequentially formed on the semiconductor substrate 2. The insulating film 8 is provided so as to insulate the semiconductor substrate 2 and the amorphous film 9 containing metal from each other, and the insulating film 8 is made of, for example, a SiOx (silicon oxide) film or a SiNx (silicon nitride) film and has a thickness of, for example, about 200 nm. The amorphous film 9 containing metal can be exemplified by a TaOx (tantalum oxide) film with a thickness of 50 nm or smaller formed by sputtering. Instead of the TaOx film, for example, an AlOx (aluminum oxide) film, a TiOx (titanium oxide) film, a MoOx (molybdenum oxide) film, and an AlNx (aluminum nitride) film are also available. The first metal film 4c can be exemplified by a Ta film having a body-centered cubic crystal structure (hereinafter referred to as α-Ta film) with a thickness of about 100 nm formed by sputtering. When forming the first metal film 4c by sputtering, the temperature of the semiconductor substrate 2 is kept at, for example, about 200° C. to 500° C. Note that the amorphous film 9 containing metal and the first metal film 4c may be successively formed by using the same sputtering apparatus.

Figure 3:
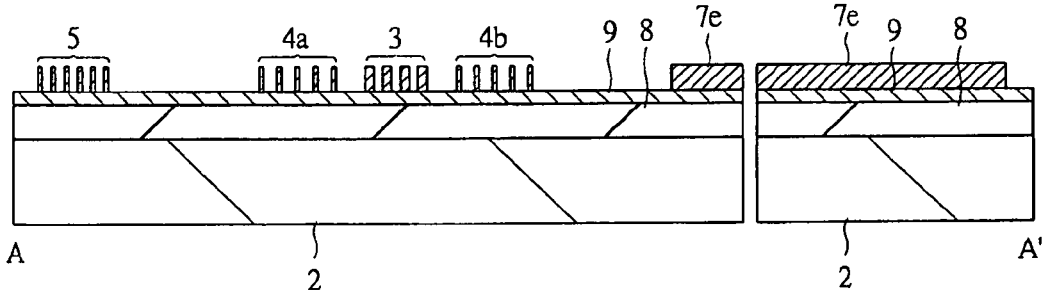
FIG. 3 is a cross-sectional view of main parts showing a manufacturing process of the thermal fluid flow sensor according to the first embodiment of the present invention.

Next, as shown in FIG. 3, the first metal film 4c is etched with using a resist pattern formed by photolithography as a mask, thereby forming the heat element 3, the resistance temperature detector 4 (upstream-side resistance temperature detector 4a and downstream-side resistance temperature detector 4b), the resistance temperature detector for air 5, and the lead wiring 7e which are all made of the first metal film 4c. Note that, although only the lead wiring 7e is shown and the illustration of other lead wirings 7a, 7b, 7c, 7d, 7f, and 7g is omitted in FIG. 3 and FIG. 4 to FIG. 6 used in the following description, these lead wirings 7a, 7b, 7c, 7d, 7f, and 7g are formed simultaneously with the lead wiring 7e.

Figure 4:
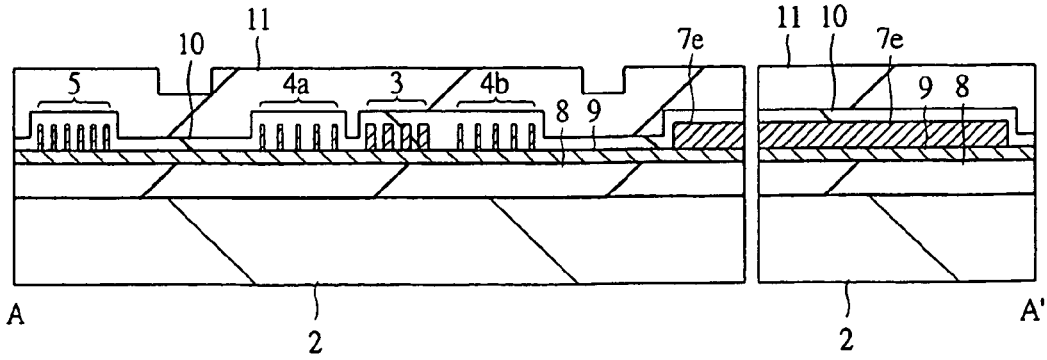
FIG. 4 is a cross-sectional view of main parts showing a manufacturing process of the thermal fluid flow sensor according to the first embodiment of the present invention.

Next, as shown in FIG. 4, a protective film 10 and an interlayer insulating film 11 are sequentially formed on the heat element 3, the resistance temperature detector 4 (upstream-side resistance temperature detector 4a and downstream-side resistance temperature detector 4b), the resistance temperature detector for air 5, and the lead wiring 7e. The protective film 10 has a function to suppress an influence due to heat treatment and is made of an oxidized compound containing metal or a nitrided compound containing metal. In consideration of a margin at the time of etching the interlayer insulating film 11, the thickness of the protective film 10 is desirably 80 nm or smaller. The interlayer insulating film 11 is formed of, for example, a SiOx film with a thickness of about 500 nm.

Figure 5:
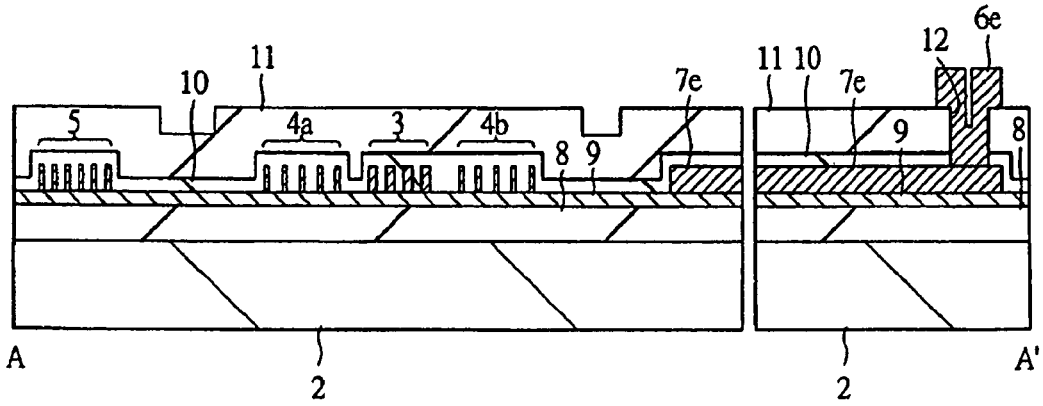
FIG. 5 is a cross-sectional view of main parts showing a manufacturing process of the thermal fluid flow sensor according to the first embodiment of the present invention.

Next, as shown in FIG. 5, the interlayer insulating film 11 and the protective film 10 are sequentially etched with using a resist pattern formed by photolithography as a mask, thereby forming a contact hole 12 for exposing a part of the lead wiring 7e made of the first metal film 4c. For the above-described etching, dry etching or wet etching is used. Then, a second metal film is formed on the upper layer of the interlayer insulating film 11 and in the contact hole 12. Thereafter, the second metal film is etched with using a resist pattern formed by photolithography as a mask, thereby forming the terminal electrode 6e electrically connecting to the lead wiring 7e via the contact hole 12. Note that, although only the terminal electrode 6e is shown and the illustration of the other terminal electrodes 6a, 6b, 6c, 6d, 6f, and 6g is omitted in FIG. 5 and FIG. 6 used in the following description, these terminal electrodes 6a, 6b, 6c, 6d, 6f, and 6g are formed simultaneously with the terminal electrode 6e.

The second metal film is formed of, for example, an Al (aluminum) alloy film with a thickness of about 1 μm. For an excellent contact with the lead wiring 7e made of the first metal film 4c, the sputter etching using Ar (argon) may be performed to the surface of the first metal film 4c before forming the second metal [layer] *film*. Furthermore, for making the contact more reliable, the second metal film may be formed of a laminated film of a barrier metal film such as TiN (titanium nitride) and an Al alloy film. Note that, in this case, if the barrier metal film is formed to be relatively thick, a contact resistance is increased. Therefore, the thickness is desirably about 20 nm. However, if a sufficient contact area can be provided and a problem of a resistance increase can be prevented, the barrier metal film can have the thickness of 100 nm or larger.

Figure 6:
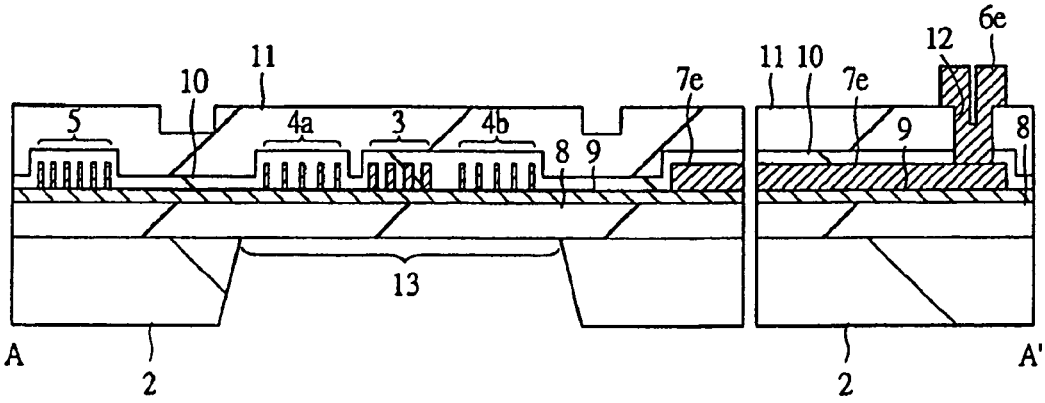
FIG. 6 is a cross-sectional view of main parts showing a manufacturing process of the thermal fluid flow sensor according to the first embodiment of the present invention.

Next, as shown in FIG. 6, a resist pattern is formed by photolithography on the rear surface of the semiconductor substrate 2. With using this resist pattern as a mask, a part of the semiconductor substrate 2 is wet-etched by using KOH (potassium hydroxide) solution or TMAH (tetramethyl ammonium hydroxide) solution to form a diaphragm 13. This diaphragm 13 is formed at a position including an area where the heat element 3 and the resistance temperature detector 4 (upstream-side resistance temperature detector 4a and downstream-side resistance temperature detector 4b) are formed.

Note that, in the first embodiment, a two-layer metal film structure composed of the first metal film 4c and the second metal film has been described. However, if wirings are crossed one another depending on the layout of the resistance elements, another metal film made of a metal similar to that forming the first metal film 4c and the second metal film may be formed to provide a three-layer metal film structure.

Figure 7:
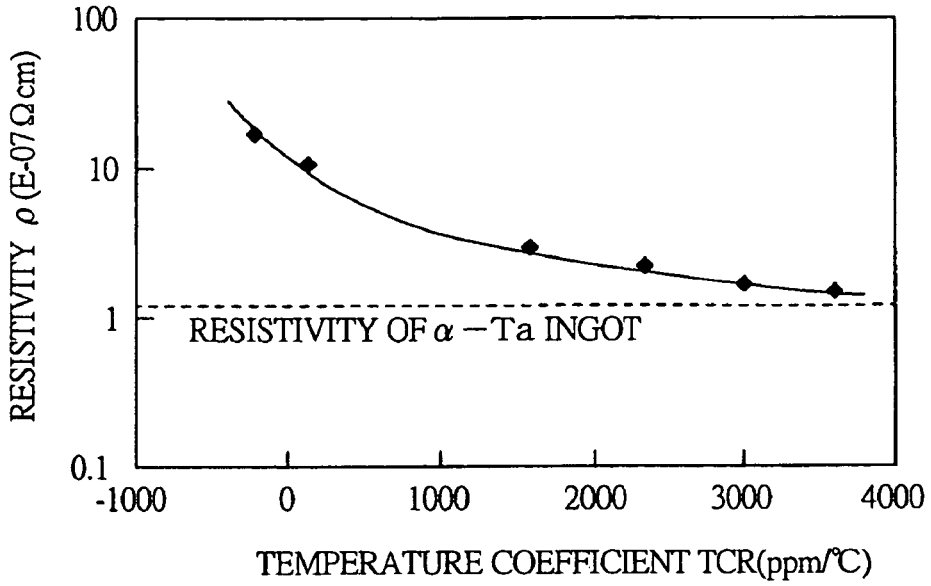
FIG. 7 is a graph showing a relation between a resistivity (room temperature) and a TCR (room temperature to 300° C.) of a Ta film formed on an amorphous film containing metal according to the first embodiment of the present invention.

FIG. 7 is a graph showing a relation between a resistivity (room temperature) and a TCR (room temperature to 300° C.) of the Ta film formed on the amorphous film containing metal according to the first embodiment.

When a Ta film is directly formed on an insulating film such as a SiOx film, Ta having a tetragonal crystal structure (hereinafter abbreviated as α-Ta) becomes predominant, and its resistivity is ten times larger than the resistivity of an α-Ta ingot and the TCR becomes approximately zero. Here, the ingot is a solid block made of a single crystal grown and solidified from melt.

On the other hand, when a Ta film is formed on the amorphous film containing metal, an α-Ta becomes predominant. Also, as shown in FIG. 7, as the resistivity of the Ta film decreases, it becomes closer to the resistivity of the α-Ta ingot, and the TCR of the Ta film is increased. Furthermore, in a Ta film in which α-Ta accounts for 50% or more, a resistivity thereof is lower than three times the resistivity of the α-Ta ingot. Accordingly, a TCR of approximately 2500 ppm/° C. or more is ensured, and thus, it is evident that a sufficiently high TCR can be obtained in practice. Furthermore, it is evident that, by controlling the resistivity, the variation in TCR of the Ta film can be reduced.

Note that the resistivity ρ of a metal film is generally approximated by Equation 1.

$$\rho=\rho_0+\alpha 1+\alpha 2+\alpha 3 \qquad \text{(Equation 1)}$$

In the Equation 1 described above, $\rho_0$ is a resistivity of an ingot made of a main metal element forming the metal film, α1 is a resistance increase due to surface scattering, α2 is a resistance increase due to grain-boundary scattering, α3 is a resistance increase due to scattering in grains. Therefore, by suppressing the items of α1 to α3 in the above Equation 1, the TCR inherent in the metal film can be obtained. However, in the case of a metal film formed on a semiconductor substrate made of single crystal Si or the like, if a fine pattern is formed, the resistance increase $\alpha 1$ due to surface scattering is increased. Accordingly, it becomes extremely difficult to make its resistivity $\rho$ close to a resistivity $\rho_0$ of the ingot. For this reason, it is important to reduce at least the resistance increase $\alpha 2$ due to grain-boundary scattering and the resistance increase $\alpha 3$ due to scattering in grains.

Meanwhile, Ta has several crystal structures, and it is important to form a Ta film having a crystal structure whose resistivity $\rho_0$ is lower, that is, an $\alpha$-Ta film. However, in a Ta film formed by sputtering or the like on an insulating film such as a SiOx film, Ta particles adhered in the course of Ta deposition are moved on the surface of the insulating film and solidified at one point to form a $\beta$-Ta polycrystal. For this reason, because of a resistance increase resulting from electronic scattering such as the resistance increase $\alpha 2$ due to grain-boundary scattering and the resistance increase $\alpha 3$ due to scattering in grains, the above-mentioned Ta film has a high resistance. Also, when changing the once-formed $\beta$-Ta to $\alpha$-Ta, high thermal energy is required. Hence, conventionally, formation of an $\alpha$-Ta film is not easy, and a relatively high TCR is difficult to obtain.

However, in the first embodiment, by forming the amorphous film 9 containing metal on the lower layer of the first metal film 4c, an $\alpha$-Ta film, which has been difficult to form, can be easily formed. It is thought that such an easy formation of an $\alpha$-Ta film is achieved because the amorphous film 9 containing metal has a surface state where bonds of a metal element are present, and thus nucleuses of $\alpha$-Ta are created, which promotes the growth of $\alpha$-Ta. Furthermore, this $\alpha$-Ta film is a polycrystal in which large crystal grains each having a coarse particle diameter of 100 nm or more are formed and such large crystal grains account for 50% or more of the entire film. The plurality of large crystal grains have a relation in which a crystal lattice arrangement in the grains forms a twin crystal or a relation of a small angle grain boundary in which a lattice plane angle is within 20 degrees. The group of the large crystal grains having such an adjacent grain-boundary contact accounts for 30% of the polycrystalline region.

Therefore, segregation of foreign substances in the grain boundary is small even in a metal film, and electronic scattering in the grain boundary which causes a resistance increase of the metal film can be suppressed. Thus, a ratio of thermally-vibrated components of the metal particles on the crystal lattice in the particles to the entire resistance of the first metal film 4c is increased, and a relatively high TCR can be achieved.

Note that, in the first embodiment, in order to form an $\alpha$-Ta film, the amorphous film 9 containing metal is formed on the lower layer of the first metal film 4c. In another method, for example, after the insulating film 8 (for example, an amorphous film such as an SiOx film not containing metal) is formed for the lower layer of the first metal film 4c, by performing sputter etching or ion implantation using Ar gas or the like, the surface of the insulating film 8 is made to have a surface state similar to that of the amorphous film 9 containing metal, that is, a surface state where bonds of the element are present. Alternatively, a lower layer of the first metal film 4c may be formed to be a crystal film having a weak orientation and not preventing the growth of $\alpha$-Ta. A ratio of $\alpha$-Ta accounting for the entire first metal film 4c may be at least 50% or more.

Figure 8:
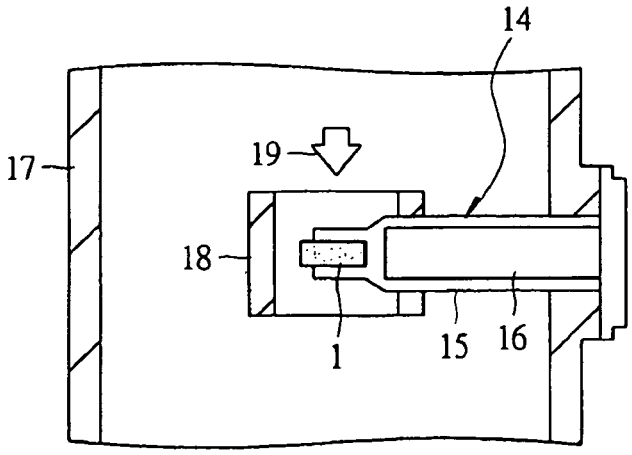
FIG. 8 is a drawing schematically showing a layout of a thermal air flowmeter installed with a thermal fluid flow sensor mounted on an air-intake passage of an internal combustion engine of an automobile or the like, according to the first embodiment of the present invention.

FIG. 8 is a drawing schematically showing a layout of a thermal air flowmeter installed with a thermal fluid flow sensor mounted on an air-intake passage of an internal combustion engine of an automobile or the like, according to the first embodiment of the present invention.

A thermal air flowmeter 14 includes a measurement device 1 which is a thermal fluid flow sensor, a support member 15 composed of an upper member and a lower member, and an external circuit 16. The measurement device 1 is disposed in a sub-passage 18 inside an air passage 17. The external circuit 16 is electrically connected to a terminal of the measurement device 1 via the support member 15. Intake air flows under the conditions of the internal combustion engine in a direction of an air flow 19 indicated by an arrow in FIG. 8 or in a direction opposite thereto.

Figure 9:
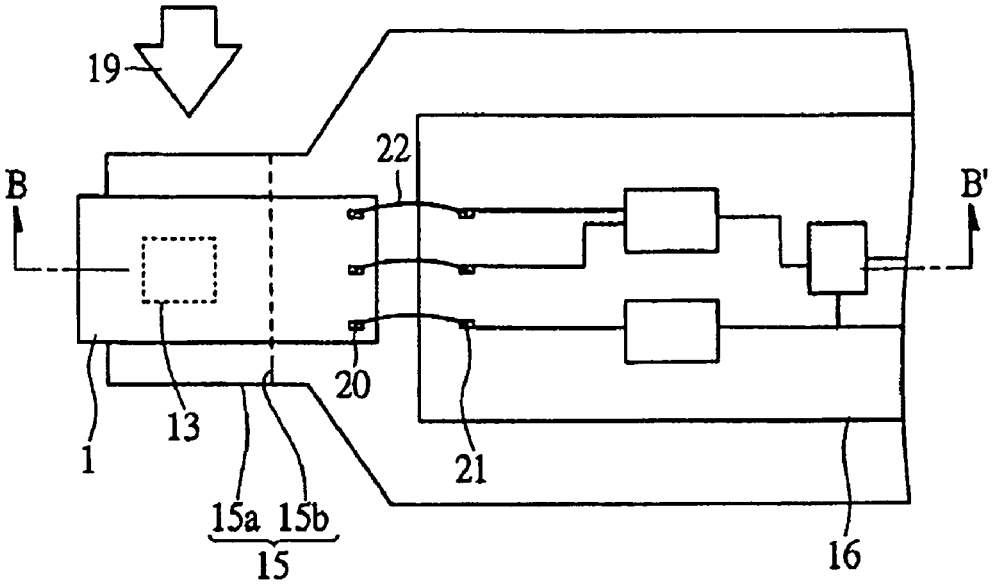
FIG. 9 is a plan view showing main parts of FIG. 8 in an enlarged manner.
Figure 10:
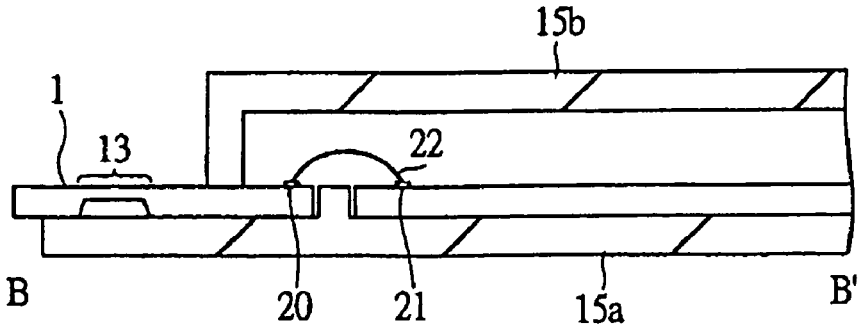
FIG. 10 is a cross-sectional view of the main parts taken along the line B-B' in FIG. 9.

FIG. 9 is a plan view showing main parts (measurement device 1 and support member 15) of FIG. 8 in an enlarge manner, and FIG. 10 is a cross-sectional view of the main parts taken along the line B-B' in FIG. 9.

As shown in FIG. 9 and FIG. 10, the measurement device 1 is fixed onto a lower support member 15a. A terminal electrode 20 of the measurement device 1 and a terminal electrode 21 of the external circuit 16 are electrically connected to each other via wire bonding using a metal wire 22. The terminal electrodes 20 and 21 and the metal wire 22 are protected by covering them with an upper support member 15b. Protection by the upper support member 15b may be the sealing protection.

Figure 11:
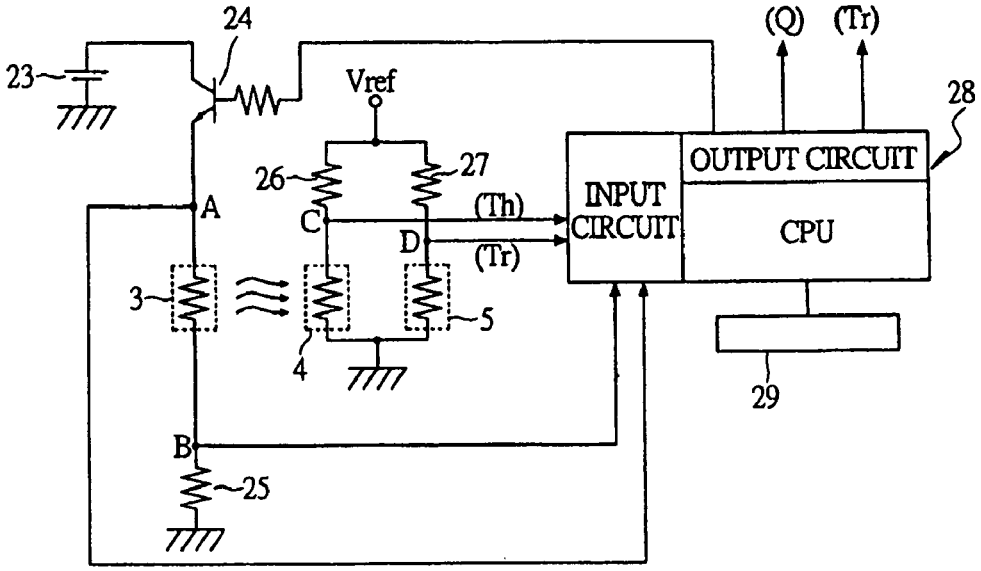
FIG. 11 is a circuit diagram showing the thermal fluid flow sensor and an external circuit according to the first embodiment of the present invention.

Next, the operation of the above-described thermal air flowmeter 14 will be described with reference to FIG. 11. FIG. 11 is a circuit diagram showing the measurement device 1 and the external circuit 16 according to the first embodiment, in which a reference numeral 23 denotes a power supply, a reference numeral 24 denotes a transistor for supplying a heating (indirect heating) current to the heat element 3, reference numerals 25, 26, and 27 denote resistors disposed in the external circuit 16, a reference numeral 28 denotes a control circuit formed of an output circuit including an A/D converter and others and a CPU (Central Processing Unit) for performing an arithmetic process and others, and a reference numeral 29 denotes a memory circuit.

Voltages at terminals C and D of a bridge circuit including the resistance temperature detector 4, the resistance temperature detector for air 5, and the resistors 26 and 27 are inputted to the control circuit 28, and resistance values of the heat element 3, the resistance temperature detector 4, the resistance temperature detector for air 5, and the resistors 25, 26, and 27 are set so that a temperature (Th) of the resistance temperature detector 4 indirectly heated by the heat element 3 becomes higher than a temperature (Tr) of the resistance temperature detector for air 5 corresponding to an air temperature by a predetermined value (for example, $\Delta Th=150°$ C.). The resistance values are controlled by the control circuit 28. When the temperature of the resistance temperature detector 4 is lower than the set value, the output of the control circuit 28 controls the transistor 24 to turn on so as to supply a heating current to the heat element 3. On the other hand, when the temperature of the resistance temperature detector 4 is higher than the set value, the output of the control circuit 28 controls the transistor 24 to turn off so as to control the temperature to the set value. At this time, the heating current (corresponding to potential B of the resistor 25) flowing to the heat element 3 represents the air flow rate (Q).

Note that, in the first embodiment, the example in which the measurement device 1 which is a thermal fluid flow sensor and the external circuit 16 are separately provided has been described. However, since the resistance elements (heat element 3 and resistance temperature detector 4) shown in the first embodiment are components generally used in a Si semiconductor process, the measurement device 1 which is a thermal fluid flow sensor and the external circuit 16 can be formed on the same semiconductor substrate 2 without using a dedicated manufacturing line. Therefore, by forming the measurement device 1 and the external circuit 16 into one chip, cost reduction can be achieved.

As described above, according to the first embodiment, since a Ta film is formed on an amorphous film containing metal (for example, TaOx film, AlOx film, TiOx film, MoOx film, or AlNx film) by sputtering, large crystal grains each having a coarse particle diameter at least 100 nm or larger are formed. Therefore, segregation of foreign substances in the grain boundary and defects in the particles can be reduced, and electronic scattering which causes a resistance increase of a metal film can be suppressed. Accordingly, an α-Ta film having a resistivity lower than three times the resistivity of a Ta ingot can be formed. As a result, a relatively high TCR inherent in the Ta film, for example, a TCR of approximately 2500 ppm/° C. or more can be obtained, and detection sensitivity of a thermal fluid flow sensor including a resistance temperature detector formed of a Ta film can be improved.

Second Embodiment

Figure 12:
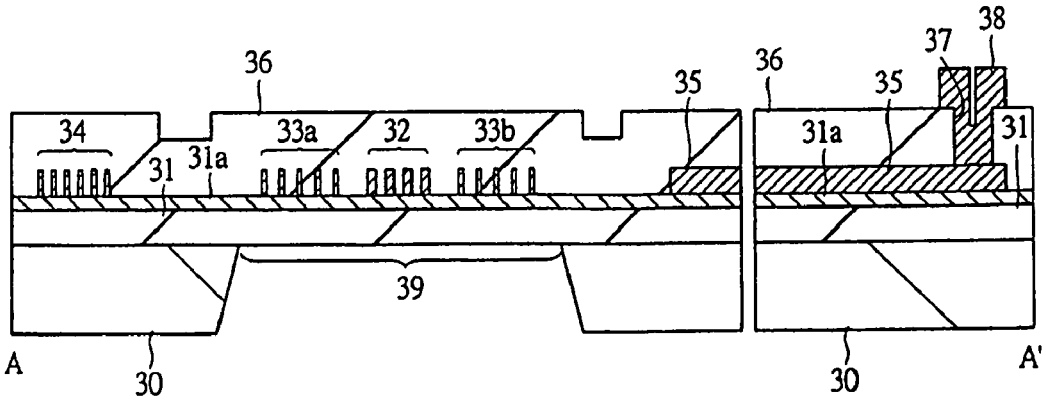
FIG. 12 is a cross-sectional view of main parts of one example of a thermal fluid flow sensor according to a second embodiment of the present invention.

In a second embodiment, a Mo (molybdenum) film is used as a metal film which forms a heat element and resistance temperature detectors included in a measurement device which is a thermal fluid flow sensor. FIG. 12 is a cross-sectional view of main parts of one example of the thermal fluid flow sensor according to the second embodiment, which shows the same portions (main parts taken along the line A-A' in FIG. 1) as those shown in FIG. 6 of the above-described first embodiment.

An insulating film 31 is formed on a semiconductor substrate 30 made of single crystal Si, and a heat element 32, a resistance temperature detector (upstream-side resistance temperature detector 33a and downstream-side resistance temperature detector 33b), a resistance temperature detector for air 34, and a lead wiring 35 which are all made of a third metal film made of, for example, Mo are formed on the insulating film 31. The insulating film 31 is provided so as to insulate the semiconductor substrate 30 and the third metal film from each other, and it is formed of, for example, a SiOx film or a SiNx film and has a thickness of, for example, about 200 nm. Also, a reforming layer 31a having a function to improve the orientation of the third metal film formed thereon is provided on the surface of the insulating film 31. This reforming layer 31a is formed by performing sputter-etching using Ar gas or the like to the surface of the insulating film 31 or by performing ion-implantation of impurities into the surface of the insulating film 31, and the reforming layer 31a has a surface state where bonds of [a metal] *an* element are present. An interlayer insulating film 36 made of a SiNx film with a thickness of about 150 nm is formed on an upper layer of the heat element 32, the resistance temperature detector (upstream-side resistance temperature detector 33a and downstream-side resistance temperature detector 33b), the resistance temperature detector for air 34, and the lead wiring 35.

Furthermore, similar to the above-described first embodiment, a contact hole 37 for exposing a part of the lead wiring 35 made of the third metal film, a terminal electrode 38 made of a fourth metal film for electrically connecting to the lead wiring 35 via the contact hole 37, and a diaphragm 39 are formed.

Note that, in FIG. 12, the interlayer insulating film 36 is directly formed on the upper layer of the heat element 32, the resistance temperature detectors (upstream-side resistance temperature detector 33a and downstream-side resistance temperature detector 33b), the resistance temperature detector for air 34, and the lead wiring 35 which are made of the third metal film (for example, Mo film). However, a nitrided compound containing metal (for example, MoN (molybdenum nitride), TiN, TaN (tantalum nitride), WN (tungsten nitride), or NiN (nickel nitride)) or an oxidized compound (for example, AlOx, MoOx, TaOx, or TiOx) may be formed between the third metal film and the interlayer insulating film 36. By doing so, adherence can be improved. Further, in the second embodiment, a two-layer metal film structure composed of the third metal film and the fourth metal film has been described. If wirings are crossed one another depending on the layout of the resistance elements, another metal film made of a metal similar to that forming the third metal film and the fourth metal film may be formed to provide a three-layer metal film structure.

Figure 13:
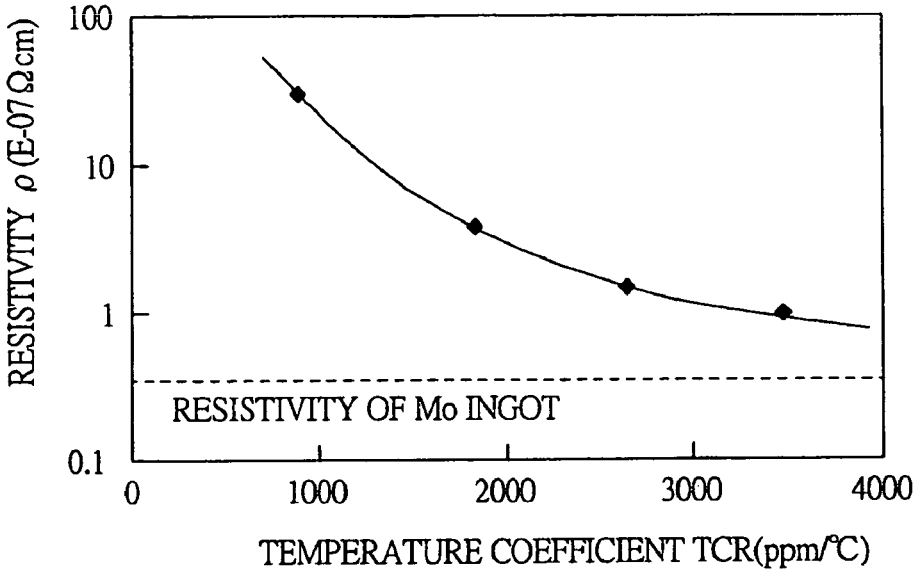
FIG. 13 is a graph showing a relation between a resistivity (room temperature) and a TCR (room temperature to 300° C.) of a Mo film formed on a reforming layer according to the second embodiment of the present invention.

FIG. 13 is a graph showing a relation between a resistivity (room temperature) and a TCR (room temperature to 300° C.) of the Mo film formed on the reforming layer according to the second embodiment.

Similar to the case of the above-described Ta film, it is evident that the resistivity and the TCR of the Mo film have a close relation. More specifically, as the resistivity of the Mo film is decreased, the TCR of the Mo film is increased. If the resistivity of the Mo film is lower than three times the resistivity of a Mo ingot, a TCR of 2000 ppm/° C. or more can be ensured, and a sufficiently high TCR can be obtained in practice. Therefore, when a Mo film having a resistivity lower than three times the resistivity of the Mo ingot is used as a resistance temperature detector, the detection accuracy can be improved, and the highly accurate temperature correction can be performed.

As described above, according to the second embodiment, by forming a Mo film by sputtering on the reforming layer 31a formed on the surface of the insulating film 31, a Mo film having a resistivity lower than three times the resistivity of a Mo ingot can be formed. As a result, a relatively high TCR inherent in the Mo film, for example, a TCR of approximately 2000 ppm/° C. or more can be obtained, and detection sensitivity of a thermal fluid flow sensor including a resistance temperature detector formed of the Mo film can be improved.

Third Embodiment

In a third embodiment, an example in which a measurement device including a heat element and resistance temperature detectors is applied to an acceleration sensor will be described.

Figure 14:
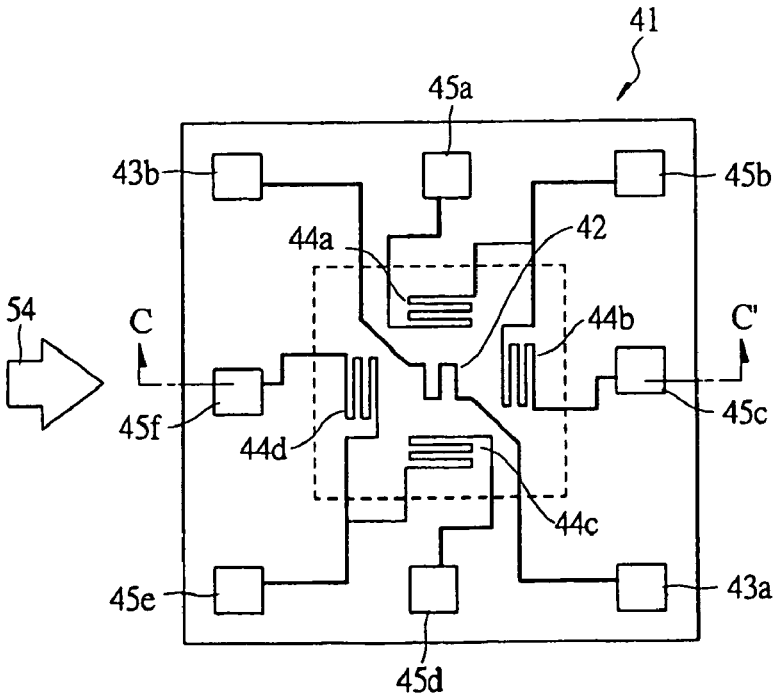
FIG. 14 is a plan view of main parts showing one example of an acceleration sensor according to a third embodiment of the present invention.

FIG. 14 is a plan view showing main parts of one example of an acceleration sensor according to the third embodiment.

An acceleration sensor 41 includes a heat element 42, terminal electrodes 43a and 43b for electrically connecting the heat element 42 and an external circuit, resistance temperature detectors 44a, 44b, 44c, and 44d having the same length (same resistance value) disposed so as to be spaced a predetermined distance apart in four directions from the heat element 42, and terminal electrodes 45a, 45b, 45c, 45d, 45e, and 45f for electrically connecting the resistance temperature detectors 44a, 44b, 44c, and 44d and the external circuit, which are all formed on a semiconductor substrate made of single crystal Si via an insulating film and the like. In the external circuit, a bridge circuit and the like is formed.

Figure 15:
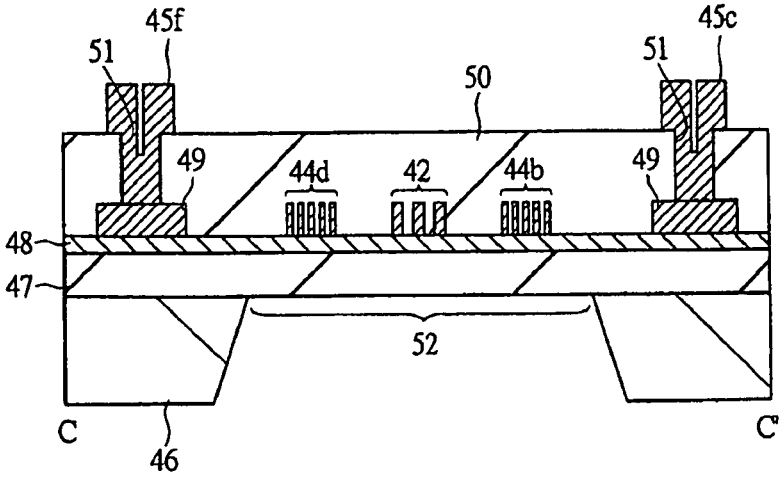
FIG. 15 is a cross-sectional view of main parts taken along the line C-C' in FIG. 14.

FIG. 15 is a cross-sectional view showing main parts taken along the line C-C' in FIG. 14.

An insulating film 47 is formed on a semiconductor substrate 46 made of single crystal Si, and an amorphous film 48 containing metal is formed on the insulating film 47. Furthermore, the heat element 42, the resistance temperature detectors 44b and 44d, and a lead wiring 49 which are all made of a fifth metal film are formed on the amorphous film 48 containing metal. The amorphous film 48 containing metal is similar to the amorphous film 9 containing metal in the above-described first embodiment, and can be exemplified by, for example, a TaOx film, AlOx film, TiOx film, MoOx film, or AlNx film with a thickness of 50 nm or smaller. Also, the fifth metal film is similar to the first metal film 4c in the above-described first embodiment, and can be exemplified by, for example, an α-Ta film with a thickness of about 100 nm.

On an upper layer of the heat element 42, the resistance temperature detectors 44b and 44d, and the lead wiring 49, an interlayer insulating film 50 made of, for example, a SiNx film with a thickness of about 150 nm is formed. Furthermore, similar to the above-described first embodiment, a contact hole 51 for exposing a part of the lead wiring 49 made of the fifth metal film, the terminal electrodes 45c and 45f electrically connecting to the lead wiring 49 via the contact hole 51, and a diaphragm 52 are formed.

Note that, although only the resistance temperature detectors 44b and 44d are shown and the illustration of the other resistance temperature detectors 44a and 44c is omitted in FIG. 15, these resistance temperature detectors 44a, 44b, 44c, and 44d are formed simultaneously. Furthermore, although only the terminal electrodes 45c and 45f are shown and the illustration of the other terminal electrodes 43a, 43b, 45a, 45b, 45d, and 45e is omitted in FIG. 15, these terminal electrodes 43a, 43b, 45a, 45b, 45c, 45d, 45e, and 45f are formed simultaneously.

Figure 16:
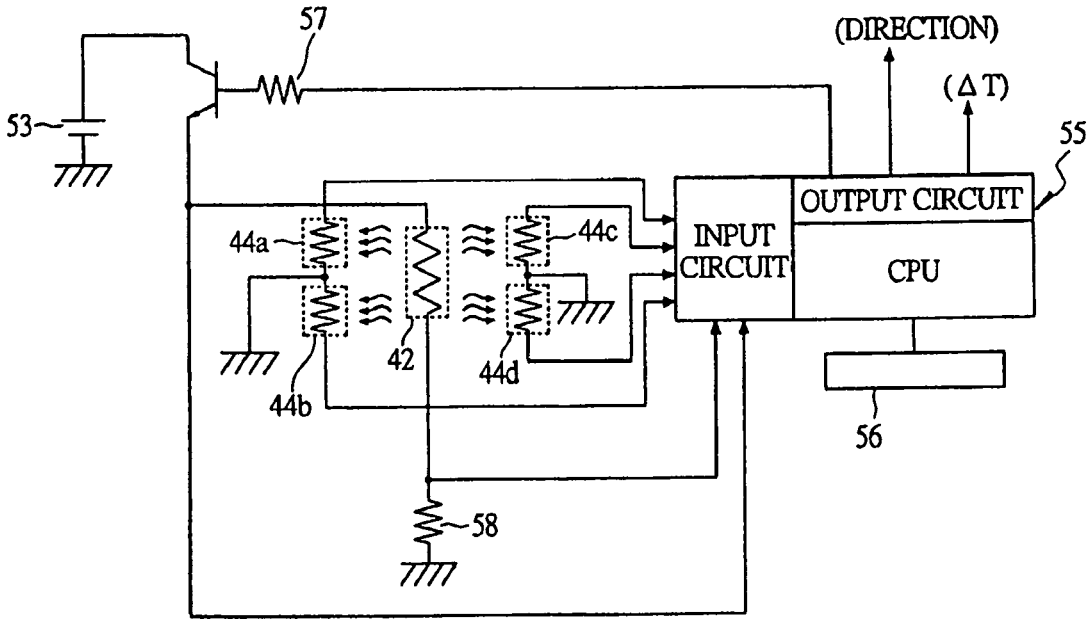
FIG. 16 is a circuit diagram showing the acceleration sensor and an external circuit according to the third embodiment of the present invention.

Next, the operation of the acceleration sensor will be described with reference to FIG. 16 and above-described FIG. 14. FIG. 16 is a circuit diagram showing the acceleration sensor and the external circuit according to the third embodiment.

First, a heating current for indirect heating is supplied from an external power supply 53 to the heat element 42. With this indirect heating, each of the resistance temperature detectors 44a, 44b, 44c, and 44d is heated and the resistance values thereof are changed. At this time, by keeping the heating current constant, the temperature of each of the resistance temperature detectors 44a, 44b, 44c, and 44d becomes stable, and each resistance value also becomes stable. Furthermore, since the distance from the heat element 42 to each of the resistance temperature detectors 44a, 44b, 44c, and 44d is constant, the temperatures of the resistance temperature detectors 44a, 44b, 44c, and 44d are equal to one another. Also, since the resistance temperature detectors 44a, 44b, 44c, and 44d have the same shape, their resistance values are equal to one another.

In this state, as shown in FIG. 14 for example, when a force 54 is externally applied to an acceleration sensor 41 to move the acceleration sensor 41, the balanced indirect heating state is lost, the temperatures of the resistance temperature detector 44b and the resistance temperature detector 44d become different from each other, and their resistance values are varied. In this manner, the acceleration can be detected. The difference in resistance value (voltage difference) is sent to an input circuit 55 provided externally and is compared with data of a static state stored in a memory 56 to calculate a moving direction and a temperature difference (ΔT) by a CPU or the like and output them to the outside. Base on the output result of the acceleration sensor 41, a process such as the adjustment of the acceleration or the turning on/off of a switch can be performed. Reference numerals 57 and 58 denote resistance elements for heater output adjustment.

Note that, in the third embodiment, the acceleration sensor 41 in which the resistance temperature detectors 44a, 44b, 44c, and 44d are disposed in four directions has been described. Alternatively, the number of resistance temperature detectors can be increased by changing their angles. By doing so, it is possible to accurately measure a direction in which the force 54 is applied.

Still further, the heat element 42 and the resistance temperature detectors 44a, 44b, 44c, and 44d are formed of the α-Ta film described in the first embodiment. Alternatively, they may be formed of the Mo film described in the second embodiment. Also in this case, it is possible to achieve the similar effects. Still further, since resistance elements having a relatively high TCR are provided, the acceleration sensor can be used simply as a temperature sensor.

As described above, according to the third embodiment, the present invention can be applied not only to a thermal fluid flow sensor but also to an acceleration sensor, and can achieve a highly-sensitive acceleration sensor.

In the foregoing, the invention made by the inventors of the present invention has been concretely described based on the embodiments. However, it is needless to say that the present invention is not limited to the foregoing embodiments and various modifications and alterations can be made within the scope of the present invention.

For example, in the above-described embodiments, a thermal fluid flow sensor in which the resistance temperature detector and others are formed of a metal film mainly made of Ta or Mo has been described. Alternatively, for example, a metal film mainly made of Ti (titanium), W (tungsten), Co (cobalt), Ni (nickel), Nb (niobium), Hf (hafnium), Cr (chromium), Zr (zirconium), or Fe (iron) can be used. In such a case, effects similar to those in the above-described first and second embodiments can be obtained by providing an amorphous film containing metal or providing a reforming layer of an insulating film, in which bonds of the element are present, under these metal films. More specifically, since large crystal grains each having a coarse particle diameter of 100 nm or larger are formed and segregation of foreign substances in the grain boundary is reduced, electronic scattering in the grain boundary which will cause a resistance increase of the metal film is suppressed, and thermally-vibrated components of the metal particles on the crystal lattice within the particles with respect to the entire resistance are increased. As a result, a relatively high TCR can be achieved. Therefore, also in the case where a metal film mainly containing Ti, W, Co, Ni, Nb, Hf, Cr, Zr, or Fe is used, by making the resistivity thereof lower than three times the resistivity of its ingot, detection accuracy can be improved, and highly accurate temperature correction can be achieved.

The present invention can be applied not only to the thermal fluid flow sensor and the acceleration sensor according to the above-described embodiments but also to various sensors such as a temperature sensor, humidity sensor, and gas sensor.

What is claimed is:

1. A flow sensor, which includes a heat element and a resistance temperature detector formed above a semiconductor substrate with an insulating film in-between and measures a fluid or gas flow, wherein at least said resistance temperature detector is formed of a metal film which is directly formed on an amorphous film, said amorphous film contains metal and is provided on said insulating film, and a resistivity of said metal film is lower than three times the resistivity of an ingot, which is made of a main metal element forming said metal film.

2. The flow sensor according to claim 1, wherein said metal film is any one of a Ta film, a Mo film, a Ti film, a W film, a Co film, a Ni film, a Nb film, a Hf film, a Cr film, a Zr film, and an Fe film.

3. The flow sensor according to claim 1, wherein said metal film is a Ta film, and a Ta crystal having a body-centered cubic crystal structure accounts for 50% or more of said Ta film.

4. The flow sensor according to claim 3, wherein said Ta film includes a plurality of Ta crystal grains, and said plurality of crystal grains have a relation in which a crystal lattice arrangement in the grains forms a twin crystal or a relation of a small angel grain boundary in which a lattice plane angle is within 20 degrees.

5. The flow sensor according to claim 4, wherein said plurality of crystal grains having an adjacent grain-boundary contact such as the relation in which a crystal lattice arrangement in the grains forms a twin crystal or the relation of a small angle grain boundary in which a lattice plane angle is within 20 degrees account for approximately 30% of a polycrystal region.

6. The flow sensor according to claim 1, wherein said metal film is a polycrystal in which crystal grains having a particle diameter of 100 nm or more account for 50% or more of said metal film.

7. The flow sensor according to claim 1, wherein said amorphous film containing metal has a thickness of 50 nm or smaller.

8. The flow sensor according to claim 1, wherein said amorphous film containing metal is any one of a TaOx film, an AlOx film, a TiOx film, a MoOx film, and an AlNx film.

9. The flow sensor according to claim 1, wherein an oxidized compound containing metal is formed on said metal film.

10. The flow sensor according to claim 9, wherein said oxidized compound containing metal is any one of AlOx, MoOx, TaOx, and TiOx.

11. The flow sensor according to claim 1, wherein a nitrided compound containing metal is formed on said metal film.

12. The flow sensor according to claim 11, wherein said nitrided compound containing metal is any one of MoN, TiN, TaN, WN, and NiN.

13. The flow sensor according to claim 1, wherein said flow sensor is mounted in a thermal air flowmeter together with a support member and an external circuit and measures an air flow.

14. A flow sensor, which includes a heat element and a resistance temperature detector formed above a semiconductor substrate with an insulating film in-between and measures a fluid or gas flow, wherein at least said resistance temperature detector is formed of a metal film which is directly formed on a reforming [film] *layer*, said reforming [film] *layer* has bonds of a composition element of said insulating film and is provided on a surface of said insulating film, and a resistivity of said metal film is lower than three times the resistivity of an ingot, which is made of the main metal element forming said metal film.

15. The flow sensor according to claim 14, wherein said reforming layer is formed by either one of sputter-etching and ion implantation.

16. The flow sensor according to claim 14, wherein said insulating film is either one of a SiOx film and a SiNx film.

17. The flow sensor according to claim 14, wherein said metal film is any one of a Ta film, a Mo film, a Ti film, a W film, a Co film, a Ni film, a Nb film, a Hf film, a Cr film, a Zr film, and a Fe film.

18. The flow sensor according to claim 14, wherein said metal film is a Ta film, and a Ta crystal having a body-centered cubic crystal structure accounts for 50% or more of said Ta film.

19. The flow sensor according to claim 18, wherein said Ta film includes a plurality of Ta crystal grains, and said plurality of crystal grains have a relation in which a crystal lattice arrangement in the grains forms a twin crystal or a relation of a small angle grain boundary in which a lattice plane angle is within 20 degrees.

20. The flow sensor according to claim 19, wherein said plurality of crystal grains having an adjacent grain-boundary contact such as the relation in which a crystal lattice arrangement in the grains forms a twin crystal or the relation of a small angle grain boundary in which a lattice plane angle is within 20 degrees account for approximately 30% of a polycrystal region.

21. The flow sensor according to claim 14, wherein said metal film is a polycrystal in which crystal grains having a particle diameter of 100 nm or more account for 50% or more of said Ta film.

22. The flow sensor according to claim 14, wherein an oxidized compound containing metal is formed on said metal film.

23. The flow sensor according to claim 22, wherein said oxidized compound containing metal is any one of AlOX, MoOX, TaOX, and TiOX.

24. The flow sensor according to claim 14, wherein a nitrided compound containing metal is formed on said metal film.

25. The flow sensor according to claim 24, wherein said nitrided compound containing metal is any one of MoN, TiN, TaN, WN, and NiN.

26. The flow sensor according to claim 14, wherein said flow sensor is mounted in a thermal air flowmeter together with a support member and an external circuit, and measures an air flow.

27. A flow sensor, which includes a heat element and a resistance temperature detector formed above a semiconductor substrate with an insulating film in-between and measures a fluid or gas flow, wherein said heat element and said resistance temperature detector are formed of a metal film which is directly formed on an amorphous film, said amorphous film contains metal and is provided on said insulating film, a resistivity of said metal film is lower than three times the resistivity of an ingot, which is made of a main metal element forming said metal film, and a temperature coefficient of resistance of said metal film is 2000 ppm/° C. or more.

28. The flow sensor according to claim 27, wherein said metal film is a Mo film.

29. The flow sensor according to claim 27, wherein said metal film is a Ta film, and said temperature coefficient of resistance of said Ta film is 2500 ppm/° C. or more.

30. A flow sensor, which includes a heat element and a resistance temperature detector formed above a semiconductor substrate with an insulating film in-between and measures a fluid or gas flow, wherein said heat element and said resistance temperature detector are formed of a metal film which is directly formed on a reforming [film] *layer*, said reforming [film] *layer* has bonds of a composition element of said insulating film and is provided on a surface of said insulating film, a resistivity of said metal film is lower than three times the resistivity of an ingot, which is made of a main metal element forming said metal film, and a temperature coefficient of resistance of said metal film is 2000 ppm/° C. or more.

31. The flow sensor according to claim 30, wherein said metal film is a Mo film.

32. The flow sensor according to claim 30, wherein said metal film is a Ta film, and said temperature coefficient of resistance of said Ta film is 2500 ppm/° C. or more.

*33. A flow sensor which measures a fluid or gas flow comprising:*

*a measurement device which comprises:*

*a semiconductor substrate;*

*a heat element and a resistance temperature detector formed above said semiconductor substrate with an insulating film in-between, and*

*a control circuit,*

*wherein at least said resistance temperature detector is formed of a metal film which is formed on a reformed layer of said insulating film, said reformed layer has bonds of a composition element of said insulating film and is provided on a surface of said insulating film, and*

*wherein said control circuit receives a signal from said measurement device that is based on a temperature of said heat element.*

*34. The flow sensor according to claim 33,*

*wherein a first resistance temperature detector formed of said metal film is provided closer to said heat element than a second resistance temperature detector formed of said metal film, and*

*wherein said control circuit receives a first signal corresponding to said first resistance temperature detector and a second signal corresponding to said second resistance temperature detector, and*

*wherein said control circuit controls said measurement device so that a temperature of said first resistance temperature detector based on said first signal is higher than a temperature of said second resistance temperature based on said second signal by a predetermined value.*

*35. The flow sensor according to claim 34, further comprising:*

*a transistor supplying a current to said heat element,*

*wherein when said temperature of said first resistance temperature detector is lower than a set value, said control circuit controls said transistor to turn on, and*

*wherein when said temperature of said first resistance temperature detector is higher than the set value, said control circuit controls said transistor to turn off.*

*36. The flow sensor according to claim 35,*

*wherein the control circuit monitors said fluid or gas flow based on said current.*

*37. The flow sensor according to claim 33,*

*wherein said control circuit is formed on a different substrate from said semiconductor substrate.*

*38. The flow sensor according to claim 33,*

*wherein said control circuit is formed on said semiconductor substrate.*

*39. A flow sensor which measures a fluid or gas flow comprising:*

*a semiconductor substrate; and*

*a heat element and a resistance temperature detector formed above said semiconductor substrate with an insulating film in-between,*

*wherein at least said resistance temperature detector is formed of a metal film which is formed on a reformed layer of said insulation film so that an orientation of said metal film is improved, said reformed layer has bonds of a composition element of said insulating film and is provided on a surface of said insulating film.*

*40. The flow sensor according to claim 39,*

*wherein said reformed layer is formed by performing either one of sputter-etching and ion implantation.*

*41. The flow sensor according to claim 39,*

*wherein said insulating film is either one of a SiOx film and a SiNx film.*

*42. The flow sensor according to claim 39,*

*wherein said metal film is any one of a Ta film, a Mo film, a Ti film, a W film, a Co film, a Ni film, a Nb film, a Hf film, a Cr film, a Zr film and a Fe film.*

*43. The flow sensor according to claim 39,*

*wherein a nitrided compound containing metal is formed on said metal film and said nitrided compound containing metal is any one of MoN, TiN, TaN, WN and NiN.*

*44. The flow sensor according to claim 39,*

*wherein an oxidized compound containing metal is formed on said metal film and said oxidized compound containing metal is any one of AlOx, MoOx, TaOx and TiOx.*

*45. A flow sensor which measures a fluid or gas flow comprising:*

*a measurement device which comprises:*

*a semiconductor substrate; and*

*a heat element and a resistance temperature detector formed above said semiconductor substrate with an insulating film in-between; and*

*a control circuit,*

*wherein at least said resistance temperature detector is formed of a metal film which is directly on an amorphous film, said amorphous film contains metal and is provided or said insulating film, and*

*wherein said control circuit receives a signal from said measurement device that is based on a temperature of said heat element.*

*46. The flow sensor according to claim 45,*

*wherein a first resistance temperature detector formed of said metal film is provided closer to said heat element than a second resistance temperature detector formed of said metal film, and*

*wherein said control circuit receives a first signal corresponding to said first resistance temperature detector and a second signal corresponding to said second resistance temperature detector, and*

*wherein said control circuit controls said measurement device so that a temperature of said first resistance temperature detector based on said first signal is higher than a temperature of said second resistance temperature based on said second signal by a predetermined value.*

*47. The flow sensor according to claim 46, further comprising:*

*a transistor supplying a current to said heat element,*

*wherein when said temperature of said first resistance temperature detector is lower than a set value, said control circuit controls said transistor to turn on, and*

*wherein when said temperature of said first resistance temperature detector is higher than the set value, said control circuit controls said transistor to turn off.*

*48. The flow sensor according to claim 47,*

*wherein the control circuit monitors said fluid or gas flow based on said current.*

*49. The flow sensor according to claim 45,*

*wherein said control circuit is formed on a different substrate from said semiconductor substrate.*

*50. The flow sensor according to claim 45,*

*wherein said control circuit is formed on said semiconductor substrate.*

* * * * *